United States Patent
Råbe

[11] Patent Number: 5,800,671
[45] Date of Patent: Sep. 1, 1998

[54] ULTRASOUND SEALING UNIT FOR PREVENTING INTERFERENCE OF RESONANCE FREQUENCIES OF INTERFERING OSCILLATION

[75] Inventor: Magnus Råbe, Lund, Sweden

[73] Assignee: Tetra Laval Holdings & Finance S.A., Pully, Switzerland

[21] Appl. No.: 662,521

[22] Filed: Jun. 13, 1996

[30] Foreign Application Priority Data

Jun. 16, 1995 [SE] Sweden ............................ 9502201

[51] Int. Cl.⁶ ..................................... B65B 51/22
[52] U.S. Cl. ................. 156/580.1; 29/592.1; 310/321
[58] Field of Search ........................... 156/73.1, 580.1, 156/580.2; 310/311, 312, 321, 326, 328; 29/592.1

[56] References Cited

U.S. PATENT DOCUMENTS

| | | | |
|---|---|---|---|
| 2,870,521 | 1/1959 | Rudnick | 310/312 |
| 4,131,505 | 12/1978 | Davis, Jr. | |
| 4,191,906 | 3/1980 | Kogure | 310/312 |
| 5,057,182 | 10/1991 | Wuchinich | |

FOREIGN PATENT DOCUMENTS

| | | |
|---|---|---|
| 615907 | 2/1994 | European Pat. Off. |
| 54-100284 | 8/1979 | Japan. |
| 9300918 | 3/1993 | Sweden. |

*Primary Examiner*—Richard Crispino
*Attorney, Agent, or Firm*—Burns, Doane, Swecker & Mathis, L.L.P.

[57] ABSTRACT

The invention relates to a method for steering resonance frequencies of interfering oscillation modes. The invention is applicable to that type of ultrasound sealing unit (1) which has a drive unit (2), centrally placed above the point of intersection between the two planes of symmetry (8) into which the sealing unit may be divided. The sealing unit (1) has reaction bodies (3) surrounding the drive unit (2), and a horn (4) with an elongate, narrow sealing surface (5). The sealing unit has a nodal plane between the reaction bodies (3) and the horn (4) in which plane the sealing unit is fixed with the aid of the anchorage edge (7). The resonance frequencies of the interfering oscillation modes which negatively influence the function of the sealing unit are steered in that symmetrically placed grooves (9) are provided in the reaction bodies (3). The grooves (9) are placed where the interfering oscillation modes have a maximum of potential, or alternatively a maximum of displacement.

9 Claims, 1 Drawing Sheet

5,800,671

ULTRASOUND SEALING UNIT FOR PREVENTING INTERFERENCE OF RESONANCE FREQUENCIES OF INTERFERING OSCILLATION

TECHNICAL FIELD

The present invention relates to a method for steering resonance frequencies of interfering oscillation modes in ultrasound sealing units of the type which has a centrally placed drive unit surrounded by reaction bodies, and a horn with an elongate, narrow sealing surface.

BACKGROUND ART

It is generally known to employ ultrasound units for sealing purposes. This method may likewise be employed for sealing in filling machines of the type which packs liquid foods into packages of the single use disposable type. In the filling machine, a packaging material web is formed into a tube with an overlapping longitudinal joint seam or seal. The packaging material may consist of a core of paper or paperboard to which is laminated different thermoplastic layers, and possibly aluminium foil. The packaging material web formed into a tube is filled with its intended contents, and the material tube is transversely sealed at regularly recurring spacing. The liquid-filled tube is thereafter severed in the transverse seals to form individual packages.

The ultrasound sealing unit described in Swedish Patent Application No. SE 9300918-1 is particularly adapted for use in transverse joint sealing of the material tube in a filling machine of the above-described type. The sealing unit has an elongate and narrow sealing surface whose width corresponds to the width of the transverse joint seal. In order to realise a sufficiently long transverse joint seal, a number of sealing units must be built together to form a composite, complete unit of sealing equipment.

Such ultrasound sealing equipment with a complex geometry must operate with a defined, fundamental oscillation mode at a given working frequency. This oscillation mode must be able to be excited by the drive unit of the sealing unit and, in order to be able to obtain a uniform and sufficiently elevated amplitude for sealing, there should be no interfering oscillation mode placed too close to the working frequency of the fundamental oscillation mode.

In the production of these ultrasound sealing units, there may be asymmetries in the material, or asymmetries may occur in the processing of the material. Such asymmetries may occur in up to thirty percent of the produced units. These asymmetries give rise to interfering oscillation modes at resonance frequencies close to the working frequency, which contribute to an uneven amplitude which, in turn, results in an uneven seal. They further give rise to unfavourable strains and stresses in the units, which are a contributory factor in reducing the service life of such units. The degree of efficiency of the sealing units is further weakened by interfering oscillation modes.

SUMMARY OF THE INVENTION

One object of the present invention is to realise a method for steering the resonance frequencies of the interfering oscillation modes which give rise to the above-outlined inconveniences. Employing the method of the present invention, it is possible to move the resonance frequencies of the interfering oscillation modes so that the oscillation modes no longer constitute an element of interference.

Yet a further object of the present invention is to ensure that a hundred percent of the produced sealing units are operative and that they display the desired function.

These and other objects have been attained according to the present invention in that the method of the type disclosed by way of introduction has been given the characterizing feature that symmetrically placed grooves are provided in the reaction bodies, the grooves being placed where the interfering oscillation modes display a maximum of potential, or alternatively a maximum of displacement.

BRIEF DESCRIPTION OF THE ACCOMPANYING DRAWINGS

One preferred embodiment of the present invention will now be described in greater detail hereinbelow, with particular reference to the accompanying Drawings, in which.

DESCRIPTION OF PREFERRED EMBODIMENT

Figure 1:
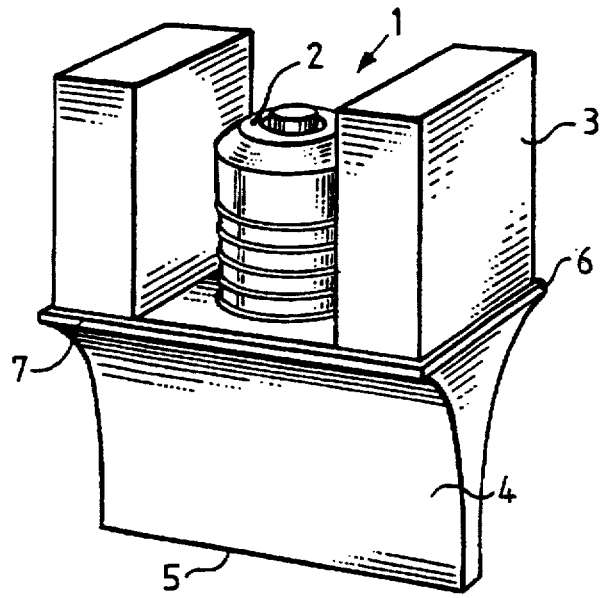
FIG. 1 is a schematic diagram of an ultrasound sealing unit for which the method according to the present invention is intended.

FIG. 1 is a schematic diagram of an ultrasound sealing unit 1 for which the method according to the present invention is intended. This ultrasound unit 1 is only one half of a wave length long, since there is very limited space available in the filling machines in which it is to be employed. This is in order that the sealing unit 1 may be usable in existing filling machines without these needing to be redesigned and retroconstructed to any great extent. The filling machine is intended to pack liquid foods into packages of the single use disposable type. A packaging material web consisting of a laminate of paper or paperboard, different thermoplastic layers and possibly aluminium foil is formed in the filling machine into a tube which is filled with the intended contents. The material web is transversely sealed across the liquid tube and the material web is severed in the transverse seals to form individual packages. It is for the transverse sealing operations that this sealing unit 1 has been developed.

The ultrasound sealing unit 1 in FIG. 1 consists of a centrally placed drive unit 2 which is connected to an a.c. source (not shown). The drive unit 2 is placed centrally in the point of intersection of the two planes of symmetry (see FIG. 2) into which the sealing unit 1 may be divided. The drive unit 2 is surrounded by symmetrically placed reaction bodies 3. The sealing unit 1 further consists of a horn 4 which is terminated by an elongate, narrow sealing surface 5. The width of the sealing surface 5 corresponds to the width of the transverse joint seals. In order to achieve the length of the transverse joint seals, a number of the above described sealing units 1 must be combined together to form a complete unit of ultrasound sealing equipment. The nodal plane 6 of the sealing unit, i.e. a plane where the amplitude of the unit 1 is zero, is to be found between the horn 4 and the reaction bodies 3. The nodal plane 6 is provided with an anchorage edge 7 and it is here that the unit 1 is fixed in the filling machine. The purpose of the reaction bodies 3 is to give rise to counter-oscillations which compensate for the forces which occur when the horn 4 oscillates.

An ultrasound sealing unit 1 possessing such a complex geometry as that described above may oscillate in a large number of different oscillation modes, and each oscillation mode has a specific resonance frequency. In order that the unit 1 be able to operate satisfactorily, a specific, fundamental oscillation mode or working mode with a defined working frequency must be insulated from the remaining oscillation modes. This working mode is to give a uniform amplitude throughout the entire sealing surface 5, a sufficiently elevated amplitude so as to obtain a uniform and reliable seal, and a well-defined nodal plane 6 so that the unit 1 may be fixed in the anchorage edge 7. It should not give rise to excessively high stresses in material or construction, and it must be possible for the drive unit 2 to excite this working mode.

Figure 2:
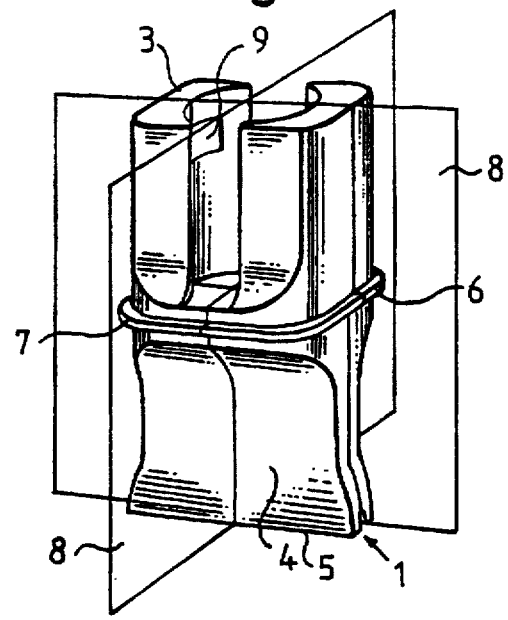
FIG. 2 shows a sealing unit according to the present invention.
Figure 3:
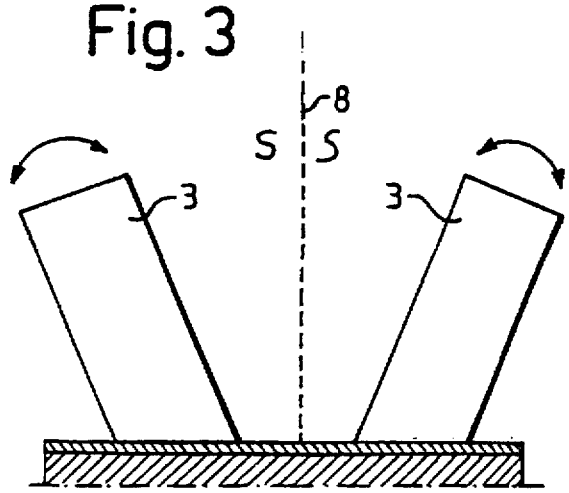
FIG. 3 shows a symmetric reflection of an oscillation.
Figure 4:
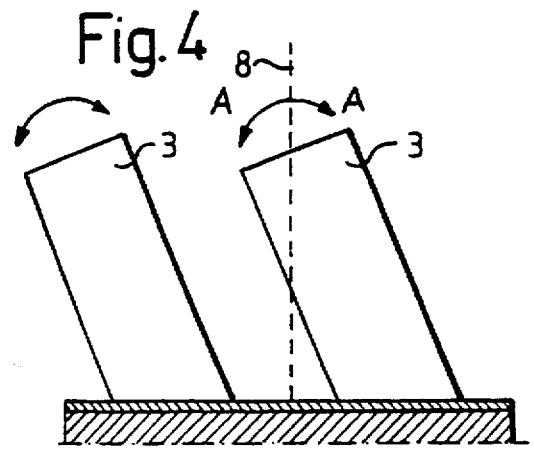
FIG. 4 shows an anti-symmetric reflection of an oscillation.

By employing FEM calculations (Finite Element Method), it is possible to determine the appearance of all of the different oscillation modes which occur in a sealing unit 1, as well as to localize the resonance frequencies of the oscillation modes. The sealing unit 1 has two planes of symmetry 8 as shown in FIG. 2, and in both of these planes, symmetric reflections S may occur, as illustrated in FIG. 3, and anti-symmetric reflections A, as shown in FIG. 4. As a result of two planes of symmetry 8, four different cases may thereby occur, SS, AS, SA and AA. Both FIG. 3 and FIG. 4 show greatly simplified examples of the oscillating movement of the reaction bodies 3. A sealing unit 1 may have up to thirty-five different oscillation modes between 0 and 40 kHz.

The fundamental oscillation mode or working mode is of the SS type. This is to be favoured and insulated as far as is possible from other oscillation modes. In particular, other oscillation modes of the SS type must be kept at a distance of at least ±5 kHz. In order to be sure of achieving the sealing that is required using an ultrasound sealing unit 1, a check must be maintained on all of the oscillation modes that occur ±10 kHz from the frequency of the working mode.

Because asymmetries may occur in the material of the sealing unit 1 or may arise when this is processed, oscillation modes of the AS, SA and AA types may be generated. These oscillation modes will cause interference since they occur ±1 kHz from the working mode. The closer they are, the greater the interference they cause. These interfering oscillation modes give an uneven amplitude, which results in an uneven seal. At worst, the interfering oscillation mode may become completely dominant over the working mode and no seal will then occur at all. The interfering oscillation modes further give rise to unfavourable stresses in material and construction, which shortens the service life of the sealing unit 1. As a result of these interfering oscillation modes, the sealing unit 1 will be less efficient because of the energy losses which are dissipated as heat.

An oscillation mode has several maxima of potential and several maxima of displacement. In order to be able to move the resonance frequency of an interfering oscillation mode, a maximum must be selected which does not coincide with any maximum of potential or displacement of the fundamental, or working, oscillation mode. The fundamental oscillation mode should preferably have a minimum of potential or displacement where the modification takes place.

In order to avoid these interfering oscillation modes, it is possible according to the present invention to steer the resonance frequencies of the interfering oscillation modes so that they no longer cause interference. This is realized by providing grooves 9 in the reaction bodies 3 on the sealing unit 1. These grooves 9 must be symmetrically placed and formed. The grooves 9 are placed where there is a maximum of potential, i.e. a maximum of bending of the undesired oscillation mode, at the same time as the working mode should not change character or be shifted away from the working frequency. Alternatively, symmetrically placed grooves or bevels are made where the interfering oscillation modes display a maximum of displacement.

Also in this case, the fundamental oscillation mode should not change character or be shifted away from the working frequency. The fundamental oscillation mode retains its character and resonance frequency if the change is made where the fundamental oscillation mode displays but slight potential and minor displacements.

The height, width and length of the grooves 9 control the displacement distance. If there are several interfering oscillation modes, it may be necessary to provide grooves 9 in each side, for each oscillation mode. Alternatively, a maximum of potential or a maximum of displacement for several different interfering oscillation modes may coincide, and this then makes it possible to provide only one common groove 9 in each side for the oscillation modes.

By providing grooves 9 in the reaction bodies 3 where a specific oscillation mode has a potential maximum, the rigidity of the mode is reduced. The distribution of mass and rigidity in a body is decisive for the oscillation modes a body may assume. It may be expressed such that a specific oscillation mode has a given rigidity and mass inertia. Areas with a maximum of potential constitute the rigidity of the oscillation mode and areas with a maximum of displacement constitute the mass inertia of the oscillation mode. If the rigidity of an oscillation mode is reduced, its resonance frequency is reduced and if the rigidity is increased, its resonance frequency is increased. Correspondingly, reduced mass inertia for an oscillation mode entails increased resonance frequency, and an increased mass inertia entails reduced resonance frequency.

It is an advantage in the present case to move the resonance frequencies of the interfering oscillation modes to a lower level, given that the working frequency of the fundamental oscillation mode may increase up to 1 kHz in the work phase proper. Given that it is a relatively simple measure to reduce the rigidity in relation to increasing mass, this alternative is to be preferred.

At the same time as the interfering oscillation modes are steered, a check must be made to ensure that no other oscillation modes are affected so that these can become interfering, by the provision of grooves 9 in the reaction bodies 3 which is put into effect according to the invention. It is vital that those measures which are carried out, i.e. the provision of the grooves 9, are so slight as possible while retaining the steering effect.

As will have been apparent from the foregoing description, the present invention realises a method for steering interfering resonance frequencies in ultrasound sealing units 1 so that the sealing unit 1 may give a uniform and reliable transverse joint seal. The method also assists in reducing unfavourable stresses and strains in the material and construction of the sealing unit 1.

The present invention should not be considered as restricted to that described above and shown on the Drawings, many modifications being conceivable without departing from the spirit and scope of the appended claims.

What is claimed is:

1. A method of constructing an ultrasound sealing unit, of the type that includes a horn having a sealing surface, a centrally located drive unit mounted on the horn and reaction bodies positioned on either side of the horn, to prevent resonance frequencies of interfering oscillation modes from interfering with a fundamental oscillating mode of the ultrasound sealing unit, comprising:

providing at least one groove in each of the reaction bodies at a position in which interfering oscillation modes of the ultrasound sealing unit during operation have a maximum potential or a maximum of displacement to thereby move the resonance frequencies of the interfering oscillation modes and prevent the resonant frequencies of the interfering oscillation modes from interfering with the fundamental oscillating mode during operation of the ultrasound sealing unit.

2. A method according to claim 1, wherein said grooves are provided in the reaction bodies so that the resonance frequencies of the interfering oscillation modes are moved to a lower level.

3. A method according to claim 1, wherein said grooves are provided in the reaction bodies so that the resonance frequencies of the interfering oscillation modes are moved at least 1 kHz.

4. A method according to claim 1, wherein said grooves are provided so as to be symmetrically disposed on the reaction bodies.

5. An ultrasound sealing unit which operates at a fundamental oscillation mode comprising:

a horn having a sealing surface at one end;

a drive unit mounted on an end of the horn opposite said one end of said horn for being connected to a power source;

a plurality of reaction bodies disposed on the end of the horn opposite said one end of said horn; and means on the reaction bodies for preventing resonant frequencies of interfering oscillation modes from interfering with the fundamental oscillation mode of the sealing unit during operation of the sealing unit.

6. An ultrasound sealing unit according to claim 5, wherein said means for preventing includes at least one groove formed in each of the reaction bodies.

7. An ultrasound sealing unit according to claim 6, wherein said grooves are symmetrically disposed in the reaction bodies.

8. An ultrasound sealing unit according to claim 5, wherein the one end of the horn is configured to provide a long and narrow sealing surface.

9. An ultrasound sealing unit according to claim 5, including a nodal plane located between the horn and the reaction bodies.

* * * * *